United States Patent Office 3,268,577
Patented August 23, 1966

3,268,577
QUATERNARY ORGANIC SALTS OF ω-DIALKYL-AMINO-2,6-DIMETHYLACETANILIDES
Jessie Evelyn Hay, Edinburgh, Scotland, assignor to Edinburgh Pharmaceutical Industries Limited
No Drawing. Original application Nov. 15, 1960, Ser. No. 69,285, now Patent No. 3,080,327, dated Mar. 5, 1963. Divided and this application Feb. 7, 1963, Ser. No. 264,993
Claims priority, application Great Britain, Nov. 20, 1959, 39,409/59; Feb. 27, 1960, 6,953/60
5 Claims. (Cl. 260—501)

This application is a division of co-pending application Serial No. 69,285, filed November 15, 1960, now Patent No. 3,080,327.

This invention relates to new quaternary salts and to compositions containing them. More specifically, it relates to quaternary salts of ω-dialkylamino-2,6-dimethylacetanilides, especially of ω-diethylamino-2,6-dimethylacetanilide, to their preparation and to their use as denaturants for organic substances, especially potable liquids and more particularly ethyl alcohol.

As is well known, it is customary to add substances to potable organic liquids, such as alcohols and similar liquids, to render them unpotable. These are referred to as denaturants. It is often desirable to add denaturants to other organic substances in order to render them unpalatable. Thus, it is often very desirable that certain oils or fats, which could be consumed by human beings or by animals but would be harmful when ingested, such as hydrocarbon oils and greases, e.g., those intended as fuels or lubricants, or low grade animal or vegetable oils and fats, such as are used as raw materials in the detergent industry, should be rendered inedible.

The denaturing of ethyl alcohol is, however, of importance for fiscal reasons. Accordingly, for use with ethyl alcohol, the nature and quantities of the denaturants are prescribed by law in most countries. For use with other organic substances, the nature and quantities of denaturants are usually not prescribed.

In the United States of America, the Internal Revenue Alcohol and Tobacco Tax Division of the U.S. Government authorizes brucine for use as an ethyl alcohol denaturant in Formula SDA-40. Formula SDA-40 contains 3 ozs. of brucine or brucine sulphate in one-eighth of a gallon of tert-butyl alcohol and is used to denature 100 gallons of ethyl alcohol of not less than 160° proof to provide a specially denatured alcohol for use in toilet preparations, including hair and scalp preparations, bayrum, perfume tinctures, toilet waters, shampoos, toilet soaps, bath salts, external pharmaceuticals, theater sprays etc. Recently there has been an acute shortage of brucine and the Internal Revenue Alcohol and Tobacco Tax Division has authorized modified formulae requiring the use of less brucine or its replacement by quassin, as follows:

SD-40-1M _____ 1½ ozs. brucine alkaloid.
SD-40-2M _____ 1½ ozs. brucine sulphate.
SD-40-3 _____ 1½ ozs. quassin.

all per 100 gallons of ethyl alcohol.

However, limitations on the supply of quassin make it an incomplete answer to the shortage of brucine. Because brucine and quassin are derived from natural products, there must always remain the risk that the supply of these denaturants may become inadequate.

Quaternary inorganic acid salts of ω-diethylamino-2,6-dimethylacetanilide, such as the halides, in which the quaternising radical is a benzyl (phenyl-methyl) radical or a chlorobenzyl (chlorophenyl-methyl) radical, such as o- or p-chlorophenyl, have an extremely bitter taste which is manifest in solutions of such quaternary salts at extremely low concentrations e.g. below 0.1% by weight. Although these quaternary inorganic acid salts, especially the halides, can be used as denaturants for lower alcohols, such as ethanol, to render them unpotable, it has been found that the resulting denatured alcohol has a corrosive action on mild steel, such as is used in the containers therefor. Ethyl alcohol for industrial and commercial purposes is not usually anhydrous. It generally contains at least 5% by volume of water. Customary strengths of ethyl alcohol used are 95%, 90%, 80% and 70% v./v., the balance being water. In this specification and the appended claims, the term "ethyl alcohol" is used to embrace aqueous ethyl alcohol as well as anhydrous or substantially anhydrous ethyl alcohol.

One object of the present invention is to provide new quaternary organic ammonium salts and processes of making them. Another object is to provide denaturants for organic substances to render them unpotable. Another object is to provide denaturants for ethyl alcohol which can replace brucine or quassin in formulations in which these substances have hitherto been used. Another object is to provide denaturants which do not render the resulting denatured alcohol corrosive to mild steel. Another object is to provide a method for rendering inedible organic substances which might be consumed by human beings or animals but which would be harmful when ingested. Another object is to provide a method of denaturing ethyl alcohol. Another object is to provide an unpotable ethyl alcohol composition which is not substantantially corrosive to mild steel. A further object is to render ethyl alcohol unpotable and less corrosive to oxidisable metals, such as ferrous metals, especially mild steel.

With these and other objects which will be apparent from the following description, the present invention provides new compounds, processes and compositions of matter as defined in the appended claims.

I have discovered that quaternary salts of ω-dialkylamino-2,6-dimethylacetanilides with organic carboxylic acids have an extremely bitter taste which is manifest in solutions of such quaternary salts at extremely low concentrations, e.g. below 0.01% by weight. I have further discovered that such quaternary organic carboxylates are suitable for replacing brucine or quassin as denaturants for ethyl alcohol. I have further discovered that solutions of these quaternary organic carboxylates in ethyl alcohol, especially aqueous ethyl alcohol, or in other lower alcohols or aqueous alcohols, do not have any substantial corrosive action on mild steel, such as is used in the containers therefor. I have further discovered that such quaternary organic carboxylates are effective for denaturing, i.e. for rendering inedible, organic substances such as hydrocarbon oils or greases or animal or vegetable oils or fats or, indeed, any organic industrial products which could be harmful if consumed by human or other living beings and might be consumed by accident or ignorance. I have still further discovered that some of these quaternary organic carboxylates even have an anti-corrosive effect when dissolved in ethyl alcohol.

My new quaternary salts of ω-dialkylamino-2,6-dimethylacetanilides are quaternary salts of an organic carboxylic anion with a quaternary organic ammonium cation of the general formula:

(I) 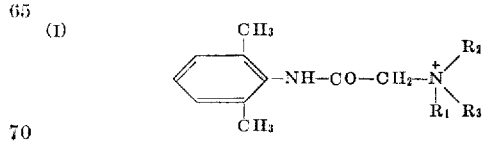

My preferred denaturants are those quaternary organic carboxylates represented by one of the two following general formulae:

(II) 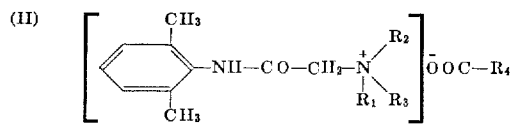

(III) 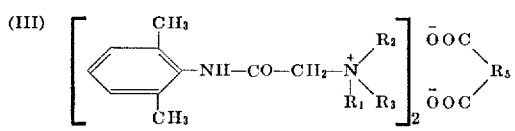

In the above formulae:

$R_1$ represents a benzyl (phenyl-methyl) or chlorobenzyl (chlorophenyl-methyl) radical, such as o- or p-chlorobenzyl, $R_2$ and $R_3$ each represents an alkyl radical containing from 1 to 4 carbon atoms, $R_4$ represents a phenyl group or substituted phenyl group or an aliphatic radical containing a carboxylic group, and $R_5$ represents a phenylene group or substituted phenylene group or an alkylene group or a substituted alkylene group of a single chemical bond.

$R_2$ and $R_3$ may, for example, represent methyl, ethyl, n-propyl or n-butyl radicals.

$R_4$ may, for example, represent the group having the formula (IV) 

(wherein Q represents a hydrogen atom, an amino group, a chlorine atom or a methyl group), or the group

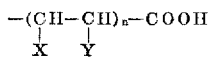

(wherein X and Y each represents a hydrogen atom or a hydroxyl group or together represent a chemical bond, and $n$ represents 0 or 1). In the latter case the quaternary carboxylates will have the general formula:

(V) 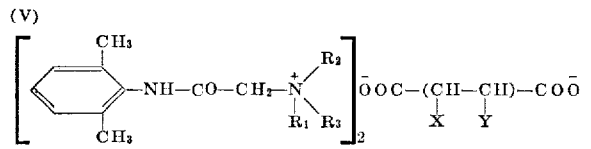

$R_5$ may, for example, represent the group

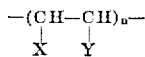

(wherein X, Y and $n$ have the meanings given above).

The quaternary carboxylates of Formula III are referred to hereinafter as "normal salts" whereas the quaternary carboxylates of Formula II when derived from dicarboxylic acids, are referred to as "acid salts."

The quaternary carboxylates of the present invention have an extremely bitter taste which is manifest in solutions of such quaternary carboxylates at extremely low concentrations, e.g. below 0.01%; this renders them particularly suitable for use as denaturants for organic substances, especially potable liquids such as lower alcohols and more particularly ethyl alcohol, to render them unpotable. These quaternary carboxylates can be synthesized from available raw materials and can be used as effective alcohol denaturants in quantities much less than those prescribed for quassin. They satisfy the requirements of a denaturant for ethyl alcohol to be used for many purposes, such as in toilet or perfumery preparations, in that they are colourless, odourless, soluble in both alcohol and water, do not give coloured solutions in alcohol or water and they have not been found to produce allergic reactions.

Ethyl alcohol can be denatured and other organic substances can be rendered unpotable or inedible by simply dissolving in or mixing with them a minor amount of one or more quaternary salts of an organic carboxylic anion with a quaternary organic ammonium cation of the general Formula I, especially a quaternary carboxylate of Formula II or III above and most suitably a benzyl quaternary carboxylate of Formula II or III above wherein $R_2$ and $R_3$ represent ethyl groups. When an alcohol, such as ethyl alcohol, is so denatured, the resulting denatured liquid does not have any substantial corrosive action on an oxidsable metal, especially a ferrous metal such as mild steel which may be used in the construction of alcohol containers. Substantial corrosion of oxidisable metal, such as mild steel, has been found to take place when a quaternary salt of an inorganic anion, such as a chloride ion, with a cation of general Formula I above, is incorporated in an alcohol, especially ethyl alcohol, to denature it and when such denatured alcohol is brought into contact with such metal, e.g. by being stored or transported in containers made from such metal. Some of the quaternary organic carboxylates of the present invention even have an anti-corrosive effect, i.e. ethyl alcohol containing them in solution has less tendency to corrode mild steel than ethyl alcohol not containing them.

The quaternary salts of cations of Formula I, such as those of Formulae II and III, wherein $R_2$ and $R_3$ represent ethyl groups are derived from ω-diethylamino-2,6-dimethylacetanilide which is known by the name of Lignocaine. The name Lignocaine is also applied to the hydrochloride of this base but will be employed in the present specification to designate the free base.

The preferred quaternary carboxylates are those derived from Lignocaine, especially Lignocaine benzyl benzoate and the Lignocaine chlorobenzyl benzoates. Ethyl alcohol denatured with these quaternary carboxylates shows little tendency to corrode mild steel. Even better, for their anti-corrosive effect, are di-(Lignocaine benzyl) oxalate, di-(Lignocaine benzyl) tartrate and the Lignocaine benzyl quaternary carboxylates represented by the formula:

(VI) 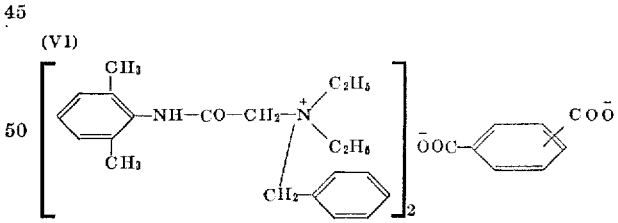

Typical examples of quaternary carboxylates of general Formula II derived from monocarboxylic acids are:

(1) Lignocaine benzyl benzoate
(2) Lignocaine benzyl o-aminobenzoate
(3) Lignocaine benzyl m-aminobenzoate
(4) Lignocaine benzyl p-aminobenzoate
(5) Lignocaine benzyl o-chlorobenzoate
(6) Lignocaine benzyl m-chlorobenzoate
(7) Lignocaine benzyl p-chlorobenzoate
(8) Lignocaine benzyl o-toluate
(9) Lignocaine benzyl m-toluate
(10) Lignocaine benzyl p-toluate
(11) Lignocaine p-chlorobenzyl benzoate
(12) ω-Dimethylamino-2,6-dimethylacetanilide benzyl benzoate
(13) ω-Di-n-propylamino-2,6-dimethylacetanilide benzyl benzoate
(14) ω-Di-n-butylamino-2,6-dimethylacetanilide benzyl benzoate Typical examples of quaternary carboxylates of general Formula III which are normal salts derived from dicarboxylic acids are:

(15) Di-(Lignocaine benzyl) oxalate
(16) Di-(Lignocaine benzyl) phthalate
(17) Di-(Lignocaine benzyl) isophthalate
(18) Di-(Lignocaine benzyl) terephthalate
(19) Di-(Lignocaine benzyl) tartrate
(20) Di-(Lignocaine benzyl) maleate
(21) Di-(Lignocaine benzyl) succinate Typical examples of quaternary carboxylates of general Formula II which are acid salts derived from dicarboxylic acids are:

(22) Lignocaine benzyl hydrogen phthalate
(23) Lignocaine benzyl hydrogen tartrate
(24) Lignocaine benzyl hydrogen oxalate All of the above named quaternary organic carboxylates are extremely bitter. Further, their presence in solution in aqueous ethyl alcohol does not promote the corrosion of mild steel in contact with such aqueous alcohol; on the contrary, their presence generally tends to inhibit such corrosion. As will be explained hereinafter, compounds Nos. 1 to 19 appear to inhibit corrosion of mild steel and compounds Nos. 15 to 19 appear to do this even better than compound No. 1. Compound No. 1 is, however, the most convenient of these compounds to make and use and it gives effectively denatured ethyl alcohol which is not substantially corrosive to mild steel.

Compounds 20 to 24 when dissolved in ethyl alcohol give solutions which are substantially noncorrosive to mild steel. In this respect, therefore, they are much more suitable for use as denaturants than Lignocaine benzyl quaternary halides since these give solutions in ethyl alcohol which are objectionably corrosive to mild steel. This is particularly surprising in the case of compounds Nos. 22 to 24 which are acid salts.

The proportion of quaternary salt of an organic carboxylic anion with a cation of Formula I, especially a quaternary salt of Formula II or III above, used with the organic compound to denature it may vary over a wide range, although, generally speaking, only small amounts are required, i.e. much less than 1% and usually less than 0.1% and of the order of 0.01% by weight.

In the case of ethyl alcohol, for example, the denaturing of which is a principal object of the invention, a concentration of as little as 0.005% by weight of a denaturant of this invention will render the alcohol quite unpotable. The larger the proportion of denaturant, the more distasteful will be the denatured alcohol but it is naturally undesirable to use any more than is necessary for making the alcohol unpotable. Concentrations of less has 0.01% by weight will suffice for this purpose and at concentrations as low as 0.0005% by weight the bitterness is quite apparent. Preferably concentrations from 0.01% to 0.001% by weight are employed to denature ethyl alcohol which may be of any desired strength but is generally 95% v./v. Similar proportions are suitable for denaturing other organic substances such as hydrocarbon oils and greases or low grade animal or vegetable oils and fats.

The organic compound can quite readily be denatured by simply mixing the quaternary carboxylate therewith or dissolving the quaternary carboxylate therein. It is generally most convenient to add the quaternary carboxylate in the form of a dilute solution of known strength to the organic compound. Such solution may be made in any convenient solvent, i.e. any solvent which is sufficiently miscible with the organic compound to be denatured. Such solvent may be an organic liquid such as an alcohol, e.g. methanol or ethanol, or a ketone, such as acetone. Since only a dilute solution of the quaternary carboxylate is required, the solvent may be water for many uses, i.e. denaturing ethyl alcohol. The solution may have any convenient strength, e.g. from 0.01% to 5% by weight.

For denaturing ethyl alcohol it has been found very convenient to use an aqueous solution of Lignocaine benzyl benzoate having a concentration of 0.256 w./v., i.e. 0.256 gm. per 100 ml.

The invention accordingly includes, as a composition of matter, an organic substance which has been denatured by the incorporation therein of a minor proportion, especially less than 0.1% by weight, of a quaternary organic carboxylate of the invention. In particular, the invention includes, as a composition of matter, an organic substance which has been denatured by the incorporation therein of less than 0.01% by weight of Lignocaine benzyl benzoate.

In particular, the invention includes ethyl alcohol which has been denatured by having dissolved therein a minor proportion, especially less than 0.1% by weight of a quaternary organic carboxylate of the invention, most suitably less than 0.01% by weight of Lignocaine benzyl benzoate.

Ethyl alcohol containing not less than 5% by volume of water is advantageously denatured by the incorporation therein of from 0.01% to 0.001% by weight of Lignocaine benzyl benzoate.

The quaternary carboxylates of the present invention can be obtained according to the process of the invention by combining an organic carboxylic anion with a cation of general Formula I. This can be done by simply bringing the organic carboxylic acid, while in solution in an organic solvent, such as ethanol or methanol, into contact with a solution containing the hydroxide of the cation in an organic solvent, such as ethanol or methanol. Such quaternary hydroxides are generally hydroscopic and often unstable. They are, therefore, best used in solution in the organic solvent in which they have been prepared, e.g. as described hereinafter.

The invention accordingly includes the process of making a quaternary organic carboxylate which comprises combining an organic carboxylic acid with a quaternary organic ammonium hydroxide of the general formula:

(VII)

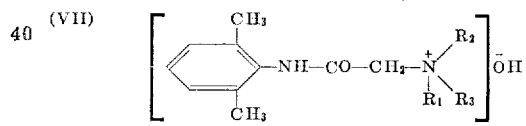

wherein $R_1$, $R_2$ and $R_3$ have the meanings hereinbefore given, preferably in an organic solvent for the acid and the hydroxide, such as methanol or ethanol.

Thus, the quaternary carboxylates of Formula II can be made by combining one molecular proportion of an organic acid of the general formula:

(VIII)  R₄COOH wherein $R_4$ has the meaning hereinbefore given, with one molecular proportion of the appropriate quaternary organic ammonium hydroxide, i.e. a compound of the general Formula VII hereinbefore given. Most suitably, the organic acid is one of the general formula:

(IX)

wherein:

Q represents a hydrogen atom, a chlorine atom, an amino group or a methyl group.

So, also, the quaternary carboxylates of Formula III can be made by combining one molecular proportion of an organic acid of the general formula:

(X)  HOOCR₅COOH wherein $R_5$ has the meaning hereinbefore given, with two molecular proportions of the appropriate quaternary organic ammonium hydroxide, i.e. a compound of the general Formula VII.

The carboxylic acid and quaternary organic ammonium hydroxide readily combine when solutions of them in methanol or ethanol are simply mixed together. The quaternary salt can be isolated by evaporating off the alcohol under reduced pressure and, if the residue is syrupy, adding to it a non-solvent such as ether to solidify it. It is desirable to avoid heating the quaternary carboxylates; undue heating will decompose them.

A quaternary organic ammonium hydroxide of Formula VII can be obtained from a quaternary organic ammonium halide of the general formula:

(XI)
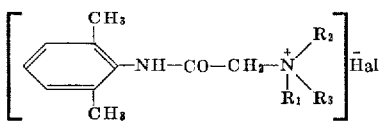

wherein $R_1$, $R_2$, $R_3$ and Hal have the meanings hereinbefore given. One convenient method of obtaining a quaternary organic ammonium hydroxide of Formula VII is by treatment of a quaternary organic ammonium halide of Formula XI, especially the chloride, with alcoholic caustic alkali. Another convenient method of obtaining a quaternary organic ammonium hydroxide of Formula VII is by bringing a quaternary organic ammonium halide of Formula XI, especially the chloride, while in aqueous or alcoholic solution, into contact with an ion-exchange resin in the hydroxide form. One molecular proportion of the appropriate acid of Formula VIII or IX or one-half molecular proportion of the appropriate acid of Formula X can then be added to the aqueous or alcoholic solution of the quaternary organic ammonium hydroxide so obtained and the resulting solution can be evaporated to dryness for isolation of the quaternary carboxylate of Formula II or III as the case may be.

The quaternary organic ammonium halides of Formula XI can readily be made by combining a tertiary amine of the general formula:

(XII)
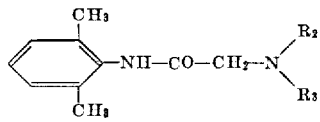

with a halide of the general formula:

(XIII)     $R_1$—Hal wherein $R_1$, $R_2$, $R_3$ and Hal each has the meaning hereinbefore given.

When the halide of Formula XIII is highly reactive, the quaternising reaction may take place at room temperature. In most cases, however, it is necessary to employ heating. It is not always necessary for the quaternising reaction to be effected in presence of a solvent but when an inert solvent is employed it is preferred to use an inert polar solvent. The recovery of the product from the reaction mixture may be carried out by various methods depending on the conditions employed. Where a solvent is employed and the solution is heated, the product may precipitate directly from the reaction medium on cooling or it may be necessary to remove the solvent by distillation and then mix the residue with dry ether in order to obtain a solid product. Where no solvent is employed, the product is best triturated with ether or other solvent such as ethyl acetate to give a friable product which may then be purified by recrystallisation.

A typical illustration of the method of preparation of quaternary organic ammonium halides of Formula XI is given hereinafter.

The invention also includes the process of making a quaternary organic carboxylate which comprises heating a quaternary organic ammonium halide of Formula XI, especially the chloride, with an alkali metal salt of an organic carboxylic acid. Thus, a quaternary carboxylate of Formula II can also be obtained by heating one molecular proportion of a quaternary organic ammonium halide of Formula XI, especially the chloride, with substantially one molecular proportion of an alkali metal salt of an organic acid of Formula VIII or IX or with substantially one molecular proportion of a monoalkali metal salt of an organic acid of Formula X, i.e. an acid of Formula VIII wherein $R_1$ contains a carboxylic group. In the latter case, a quaternary acid salt of Formula II is formed. Similarly, a quaternary normal salt of Formula III can be obtained by heating two molecular proportions of a quaternary organic ammonium halide of Formula XI, especially the chloride, with one molecular proportion of the di-alkali metal salt of an organic acid of Formula X. The reaction can, in any of these cases, conveniently be brought about by mixing the quaternary organic ammonium halide with the alkali metal carboxylate in aqueous ethanol and boiling the mixture under reflux for a few hours. The alkali metal salt used is preferably a sodium salt. The invention also includes these methods of making the quaternary organic carboxylates of the invention.

The invention is illustrated by, but is not limited to, the following examples.

*Example 1.*—ω - Diethylamino - 2,6 - dimethylacetanilide benzyl benzoate (Compound No. 1)

ω - Diethylamino-2,6-dimethylacetanilide (Lignocaine) benzyl chloride (3.6 gms.; 0.01 M) dissolved in methanol (5 ml.) was converted to the quaternary hydroxide by addition of an exact equivalent of methanolic caustic potash. After one hour the potassium chloride was filtered off, washed with methanol, and a methanolic solution of benzoic acid (1.2 gms.; 0.01 M) added to the filtrate. The solution was concentrated in vacuo to a syrup which solidified on trituration with ether, yielding crude ω - diethylamino - 2,6 - dimethylacetanilide benzyl benzoate (4.1 gms.; 91%, M.P. 155–157° C.).

The product was recrystallised from a mixture of isopropanol and ethyl acetate to give a quaternary benzoate of M.P. 160–1° C.

A similar product was obtained by recrystallising from methyl ethyl ketone and from a mixture of chloroform and ethyl acetate.

In the above example ethyl alcohol (99% v./v.) can be used instead of methanol and sodium hydroxide can be used instead of potassium hydroxide. Moreover, a mixture of ethanol and diisopropyl ether can be used for recrystallisation.

The Lignocaine benzyl chloride used in the above example was obtained by the following method of preparation.

ω - Diethylamino - 2,6 - dimethylacetanilide benzyl chloride 46.8 gm. (0.2 M) ω-diethylamino-2,6-dimethylacetanilide and 28.0 gm. (0.221 M) benzyl chloride were heated together in a 250 ml. widenecked flask for 36 hours using an oil bath at 110° C. The solid cake obtained was broken up, refluxed with 60 ml. ethyl acetate, cooled and filtered, to give 66.1 gm. of crude product, M.P. 169°–171° C. The crude product was then dissolved in the minimum quantity of boiling isopropanol and ten volumes of ethyl acetate were then added to the hot solution. On cooling and stirring there was obtained 54.2 gm. (75.19% yield) of pure product M.P. 175°–177° C.

In a similar manner using the appropriate chlorobenzyl chloride the following compounds were prepared, ω-Diethylamino-2,6-dimethylacetanilide o-chlorobenzyl chloride, M.P. 186–188° C.

ω-Diethylamino-2,6-dimethylacetanilide p-chlorobenzyl chloride M.P. 180° C.

By the procedure described after Example 1 and with the aid of any benzyl or chlorobenzyl halide, the benzyl quaternary halides and chlorobenzyl quaternary halides of general Formula XI can be made from any of the substituted ω-amino-2,6-dimethylacetanilides of the general Formula XII. From these quaternary organic ammonium halides, by the procedure described in Example 1, and from an equimolecular proportion of benzoic acid or another carboxylic acid of Formula VIII or IX, other quaternary carboxylates of Formula II can be made. Also from these quaternary organic ammonium halides or from Lignocaine benzyl halides, by the procedure described in Example 1 but using half a molecular proportion of a dicarboxylic acid of Formula X, quaternary carboxylates of Formula III can be made.

Thus, Lignocaine o-chlorobenzyl benzoate and Lignocaine p-chlorobenzyl benzoate (compound No. 11) were obtained by the procedure of Example 1 using Lignocaine o-chlorobenzyl chloride and Lignocaine p-chlorobenzyl chloride respectively in place of the Lignocaine benzyl chloride. Lignocaine o-chlorobenzyl benzoate has not, so far, been obtained in solid form.

By the procedure of Example 1 but replacing the benzoic acid by 0.01 M of the appropriate carboxylic acid of Formula IX compounds Nos. 2 to 10 were obtained.

By the procedure of Example 1 but replacing the benzoic acid by 0.005 M of the appropriate dicarboxylic acid of Formula X, compounds Nos. 15 to 21 were obtained.

By the procedure of Example 1 but replacing the

The procedure described in Example 1 was repeated using (a) acetic acid and (b) citric acid in place of benzoic acid. In case (a) a crude product of M.P. 75–78° C. was obtained. This was hygroscopic and although it doubtless consisted essentially of Lignocaine benzyl acetate, it could not be purified. In case (b) a solid product could be obtained only by drying the reaction mixture in vacuo for 7 days. The product was very hygroscopic and deliquesced immediately on exposure to air. It was impossible to purify. Both of these products were dissolved in ethyl alcohol and the tendency of the resulting solutions to corrode mild steel was tested in the manner hereinafter described. Some corrosion was produced which may possibly have been due to impurities in the products.

The following Tables A, B and C show the nature and melting points of compounds Nos. 1 to 24 and the solvent used for crystallization. In most cases, a mixture of two solvents was employed. The names of the solvents are abbreviated as follows:

Ether means Diethyl ether
EtOAc means Ethyl acetate
IPA means Isopropyl alcohol
IPE means Di-isopropyl ether
MEK means Methyl ethyl ketone
EtOH means Ethyl alcohol (99% v./v.)

TABLE A (COMPOUNDS OF FORMULA II)

| Compound No. | $R_1$ | $R_2$ | $R_3$ | $R_4$ | Solvent | M.P., °C. |
|---|---|---|---|---|---|---|
| 1 | Benzyl | Et | Et | Phenyl | IPA/EtOAc | 160–161 |
| 2 | do | Et | Et | o-Aminophenyl | IPA/Ether | 130–135 |
| 3 | do | Et | Et | m-Aminophenyl | IPA/IPE | 146–148 |
| 4 | do | Et | Et | p-Aminophenyl | IPA/Ether | 155 |
| 5 | do | Et | Et | o-Chlorophenyl | IPA/Ether | 145 |
| 6 | do | Et | Et | m-Chlorophenyl | IPA/IPE | 140–142 |
| 7 | do | Et | Et | p-Chlorophenyl | IPA/Ether | 157 |
| 8 | do | Et | Et | o-Tolyl | IPA/Ether | 143 |
| 9 | do | Et | Et | m-Tolyl | IPA/IPE | 140–142 |
| 10 | do | Et | Et | p-Tolyl | IPA/IPE | 158–160 |
| 11 | p-Chlorobenzyl | Et | Et | Phenyl | IPA/IPE | 141–143 |
| 12 | Benzyl | Me | Me | do | IPA/Ether | 150–155 |
| 13 | do | n-Pr | n-Pr | do | IPA/IPE | 148 |
| 14 | do | n-Bu | n-Bu | do | IPA/EtOAc | 143 |

TABLE B (COMPOUNDS OF FORMULA III)

| Compound No. | $R_1$ | $R_2$ | $R_3$ | $R_5$ | Solvent | M.P., °C. |
|---|---|---|---|---|---|---|
| 15 | Benzyl | Et | Et | Single bond | IPA/EtOAc | 155–157 |
| 16 | do | Et | Et | o-Phenylene | MEK/EtOAc | 114–118 |
| 17 | do | Et | Et | m-Phenylene | IPA/EtOAc | 193–194 |
| 18 | do | Et | Et | p-Phenylene | EtOH | 212 (dec.) |
| 19 | do | Et | Et | —CH(OH)-CH(OH)— | IPA/EtOAc | 183–185 |
| 20 | do | Et | Et | —CH=CH— | MEK/EtOAc | 147–150 |
| 21 | do | Et | Et | —CH₂—CH₂— | IPA/EtOAc | 161 |

TABLE C (ACID SALTS OF FORMULA II)

| Compound No. | $R_1$ | $R_2$ | $R_3$ | $R_4$ | Solvent | M.P. ° C. |
|---|---|---|---|---|---|---|
| 22 | Benzyl | Et | Et | o-Carboxyphenyl | IPA/Ether | 124–126 |
| 23 | do | Et | Et | -CH(OH)-CH(OH)-COOH | EtOH/Ether | 138–139 |
| 24 | do | Et | Et | -COOH | EtOH/Ether | 154 |

Lignocaine benzyl chloride by ω-dimethylamino-2,6-dimethylacetanilide benzyl chloride (M.P. 178° C.), ω-di-n-propylamino-2,6-dimethylacetanilide benzyl chloride (M.P. 190° C.) and ω-di-n-butylamino-2,6-dimethylacetanilide benzyl chloride (M.P. 158° C.), compounds Nos. 12, 13 and 14, respectively, were obtained. These quaternary benzyl halides, having the melting points given above, were obtained by the procedure described after Example 1 for ω-diethylamino-2,6-dimethylacetanilide benzyl chloride but using, instead of ω-diethylamino-2,6-dimethylacetanilide, the compounds ω-dimethylamino-2,6-dimethylacetanilide, ω-di-n-propyl-2,6-dimethylacetanilide and ω-di-n-butylamino-2,6-dimethylacetanilide.

*Example 2.—Compound No. 1, alternative method*

Lignocaine benzyl chloride (3.6 gms.; 0.01 M) and sodium benzoate (1.4 gm.; 0.01 M) were refluxed for 4 hours in aqueous ethanol (74 o.p.; 20 ml.). The reaction mixture was filtered and the filtrate evaporated to dryness. The residue, solidified by trituration with ether, was 3.7 gms. of crude Lignocaine benzyl benzoate (82.5% theory) M.P. 155° C.

By the procedure of Example 2 but replacing the sodium benzoate by an equimolecular proportion of a sodium salt of another carboxylic acid of Formula VIII or IX, other quaternary carboxylates of Formula II can be made.

By the procedure of Example 2 but replacing the sodium benzoate by half a molecular proportion of a disodium salt of a dicarboxylic acid of Formula X, quaternary normal salts of Formula III can be made.

By the procedure of Example 2 but replacing the sodium benzoate by an equimolecular proportion of a sodium hydrogen salt of a dicarboxylic acid of Formula X quaternary acid salts of Formula II can be made.

Thus, by the procedure of the foregoing example but replacing the sodium benzoate by 0.01 M of sodium hydrogen phthalate, sodium hydrogen tartrate or sodium hydrogen oxalate, compounds Nos. 22, 23 and 24, respectively, were obtained as white crystalline solids, soluble in ethanol.

The Lignocaine benzyl chloride used in the foregoing example may be replaced by any other quaternary organic ammonium halides of the general Formula XI to produce other quaternary carboxylates of Formulae II and III.

*Example 3.—Compound No. 1, alternative method*

An aqueous solution of Lignocaine benzyl chloride (36 gms.; 0.1 M, in 100 ml. water) was poured through a column of that polystyrene quatenary ammonium anion-exchange resin sold by Permutit Co. under the trade name "Deacidite FF." The resulting solution of Lignocaine benzyl hydroxide was neutralised with benzoic acid and the solution of Lignocaine benzyl benzoate thus formed was evaporated to dryness giving a solid residue, 38.3 gms. (86.1% theory) which was recrystallised once from a mixture of ethanol and diisopropyl ether, yielding pure Lignocaine benzyl benzoate, 33.6 gms. (77.3% theory) M.P. 160–161° C.

The Lignocaine benzyl chloride used in the foregoing example may be replaced by any other quaternary organic ammonium halide of general Formula XI to produce other quaternary organic ammonium hydroxides of the general Formula VII. From any of the quaternary organic ammonium hydroxides produced by the procedure of this example there may be obtained other quaternary carboxylates of general Formulae II and III by proceeding as described in this example but replacing the benzoic acid by an appropirate amount of another carboxylic acid of Formula VIII, IX or X.

The following example illustrates the denaturing of ethyl alcohol with the quaternary carboxylates of the present invention.

*Example 4*

In 80 gallons of 95% v./v. ethyl alcohol there were dissolved 100 grains of -diethylamino-2,6-dimethylacetanilide (Lignocaine) benzyl benzoate. This gave a denatured ethyl alcohol containing approximately 0.002% by weight of the quaternary benzoate.

Similar proportions of the quaternary benzoate can be used to denature ethyl alcohol of different strength, e.g., 90%, 80% or 70% v./v.

In place of the Lignocaine benzyl benzoate (compound No. 1) used in the foregoing example there can be used an equal amount of another quaternary carboxylate of Formula II or III, such as one of those listed above. Compounds Nos. 15 to 19 above may even be more suitable, in certain cases, than Compound No. 1 since they are believed to inhibit corrosion of mild steel even better than Lignocaine benzyl benzoate (Compound No. 1).

In order to test rapidly the ability of a quaternary carboxylate of the invention to inhibit corrosion of mild steel the following procedure was adopted.

Two solutions were made in 40% v./v. aqueous ethanol of the quaternary salt to be tested having concentrations of 0.2 oz. and 12 oz. per 100 gallons respectively. Separate strips of thoroughly cleaned mild steel were placed in two screw topped bottles which were then partially filled with the respective solutions so that portions of the strips remained above the surface of the solutions.

The tops were then screwed on and the bottles allowed to stand at room temperature (15 to 20° C.). A further strip of the same thoroughly cleaned mild steel was similarly placed in another portion of the same 40% v./v. aqueous ethanol in a screw top bottle which was sealed and left standing alongside the other two bottles to serve as a control. After two or three weeks the strips were visually compared in order to see the extent to which corrosion appeared to be inhibited by the quaternary salt being tested. By this test it appeared that compounds Nos. 15 to 19 inhibited corrosion of mild steel rather better than did compound No. 1. On the other hand, compounds Nos. 2 to 14 appeared to be inferior to compound No. 1 but were capable of inhibiting corrosion of mild steel to a useful extent.

I claim:

1. A quaternary organic carboxylate selected from the group consisting of

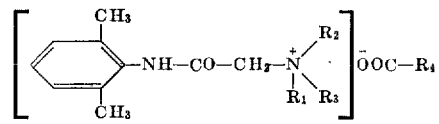

and

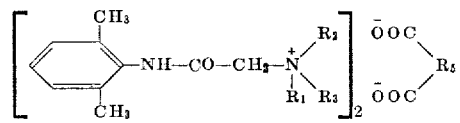

wherein:

$R_1$ is selected from the group consisting of the benzyl radical and the chlorobenzyl radicals, $R_2$ and $R_3$ each represents an alkyl radical containing from 1 to 4 carbon atoms, $R_4$ is selected from the group consisting of (a) a radical of the formula

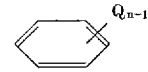

wherein Q is selected from the group consisting of $NH_2$, Cl, COOH and $CH_3$ and $n$ represents a positive integer of from 1 to 2 and (b) a radical of the formula

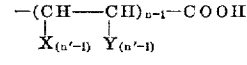

wherein X and Y is each selected from the group consisting of the hydrogen atom and the hydroxyl radical, and $n$ and $n'$ each represents a positive integer of from 1 to 2, and $R_5$ is selected from the group consisting of

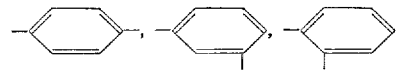

and

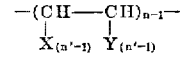

wherein X and Y are each selected from the group consisting of the hydrogen atom and the hydroxyl radical, and $n$ and $n'$ each represents a positive integer of from 1 to 2.

2. Lignocaine benzyl benzoate.
3. Lignocaine chlorobenzyl benzoate.
4. Di(Lignocaine benzyl) oxalate.
5. Di(Lignocaine benzyl) tartrate.

(References on following page)

References Cited by the Examiner

UNITED STATES PATENTS

| | | | |
|---|---|---|---|
| 2,641,610 | 6/1953 | Barber | 260—567.6 X |
| 3,014,046 | 12/1961 | Speziale | 260—562 X |
| 3,080,326 | 3/1963 | Samuel | 260—562 X |

FOREIGN PATENTS

| | | |
|---|---|---|
| 714,867 | 9/1954 | Great Britain. |
| 197,368 | 4/1958 | Austria. |

OTHER REFERENCES

Migrdichian Organic Synthesis, vol. I (Textbook), page 478 (1957), Reinhold Pub. Corp.

LORRAINE A. WEINBERGER, *Primary Examiner.*

NICHOLAS S. RIZZO, *Examiner.*

R. PRICE, M. WEBSTER, *Assistant Examiners.*